O. J. BOARD.
BEARING.
APPLICATION FILED DEC. 7, 1916.

1,240,019. Patented Sept. 11, 1917.

WITNESSES
Arthur K. Moore

INVENTOR
Okey J. Board
BY Richard B. Owen.
ATTORNEY

UNITED STATES PATENT OFFICE.

OKEY J. BOARD, OF GAY, WEST VIRGINIA.

BEARING.

1,240,019. Specification of Letters Patent. Patented Sept. 11, 1917.

Application filed December 7, 1916. Serial No. 135,651.

*To all whom it may concern:*

Be it known that I, OKEY J. BOARD, a citizen of the United States, residing at Gay, in the county of Jackson and State of West Virginia, have invented certain new and useful Improvements in Bearings, of which the following is a specification.

This invention relates to an improved bearing and the principal object of the invention is to provide a bearing having an improved type of removable bearing surface carried by the upper and lower sections of the bearing and securely held in place but releasable so that when worn, the worn bearing sufaces may be removed and new ones put in place.

Another object of the invention is to so construct the bearing that the bearing surfaces will be held against transverse as well as rotary movement in the sections of the bearing.

Another object of the invention is to so construct the bearing that while the bearing surfaces may be removed, they will at the same time be securely held in place when in position.

This invention is illustrated in the accompanying drawings, wherein:—

Figure 1:
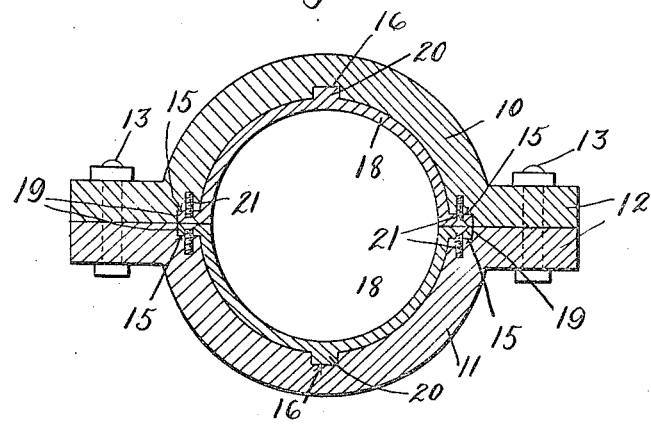
Figure 1 is a sectional view through a bearing provided with the improved bearing surfaces.
Figure 2:
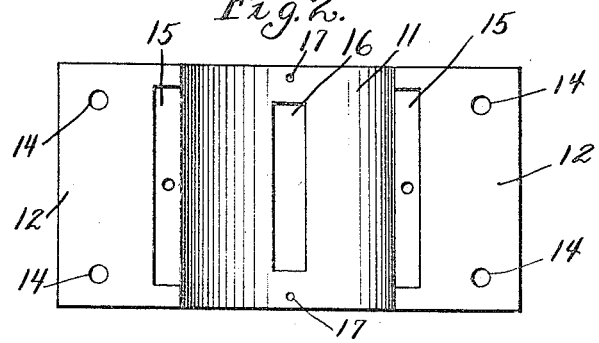
Fig. 2 is a plan view of one of the bearings showing the seats for the bearing surfaces.
Figure 3:
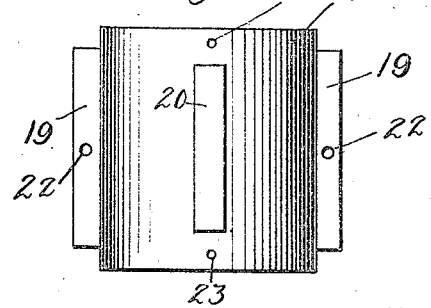
Fig. 3 is a plan view of one of the bearing surfaces.

The bearing is provided with upper and lower sections 10 and 11 having outstanding flanges 12 releasably connected by bolts 13 passing through openings 14 formed in the flanges. These sections are provided with grooves forming end seats 15 and intermediate seats 16 and are further provided with openings 17 through which a lubricant may be passed. The bearing surfaces or liners 18 are positioned within the bearing as shown in Fig. 1 and are provided with ribs or keys 19 and 20 fitting into the seats 15 and 16 respectively. It will thus be noted that when the liners are in place and secured by the machine screws or other fasteners 21 which pass through the openings 22 in the ribs 19, the lines or surfaces 18 will be securely but releasably held in place and prevented from having movement transversely of the bearing or circumferentially thereof. Openings 23 are provided in each liner and register with the openings 17 so that lubricant passing through the openings 17 may pass through the liners and thus lubricate the axle or shaft passing through the bearing.

If the liner is worn, it may be removed and a new one put in place or if both liners are worn both can be removed and new ones put in place. It will thus be seen that a bearing has been provided in which the liners or wearing surfaces may be removed when worn out thus making it unnecessary to replace the entire bearing. There has further been provided a bearing in which the liners will be securely held in place thus providing a rigid structure.

What is claimed is:

A bearing comprising separable sections arcuate throughout the greater portion of their length and having end portions extended to provide tongues positioned in contacting relation, each section being provided intermediate its length and at the inner ends of its end tongues with grooves of less width than the sections, liners positioned within the bearing against the inner faces of the sections and having end tongues extending in contacting relation and fitting into the grooves of the end tongues of the sections and having intermediate ribs fitting into the intermediate grooves of the sections, and means releasably connecting the end tongues of the section.

In testimony whereof I affix my signature in presence of two witnesses.

OKEY J. BOARD.

Witnesses:
O. H. HINZMAN,
B. F. COX.